(12) United States Patent
Popillion et al.

(10) Patent No.: US 9,699,002 B1
(45) Date of Patent: Jul. 4, 2017

(54) ELECTRONIC RECEIPT FOR PURCHASE ORDER

(75) Inventors: Jason Popillion, Gilbert, IA (US); Andrew D. Kirpalani, Des Moines, IA (US); Sireesha Suryadevara, West Des Moines, IA (US); Michael L. Hilty, Altoona, IA (US)

(73) Assignee: GCOMMERCE, INC., Des Moines, IA (US)

( * ) Notice: Subject to any disclaimer, the term of this patent is extended or adjusted under 35 U.S.C. 154(b) by 384 days.

(21) Appl. No.: 12/583,413

(22) Filed: Aug. 20, 2009

(51) Int. Cl.
G06F 15/16 (2006.01)
H04L 12/58 (2006.01)
G06Q 10/10 (2012.01)

(52) U.S. Cl.
CPC ......... *H04L 12/585* (2013.01); *G06Q 10/107* (2013.01)

(58) Field of Classification Search
CPC .......................... G06Q 10/107; H04L 12/585
USPC .................................................. 709/206, 204
See application file for complete search history.

(56) References Cited

U.S. PATENT DOCUMENTS

| | | |
|---|---|---|
| 5,689,650 A | 11/1997 | McClelland et al. |
| 6,714,915 B1 | 3/2004 | Barnard et al. |
| 7,165,174 B1 | 1/2007 | Ginter et al. |
| 7,228,304 B1 | 6/2007 | Wong et al. |
| 7,395,232 B1 | 7/2008 | Pilato |
| 2001/0014880 A1 | 8/2001 | Beach et al. |
| 2002/0107699 A1 * | 8/2002 | Rivera ............ G06Q 30/06 705/26.1 |
| 2003/0036968 A1 | 2/2003 | Ouchi |
| 2005/0257045 A1 | 11/2005 | Bushman et al. |
| 2007/0038673 A1 | 2/2007 | Broussard et al. |
| 2007/0174847 A1 * | 7/2007 | Ellis ............... G06F 17/3089 719/320 |
| 2007/0245013 A1 | 10/2007 | Saraswathy et al. |
| 2008/0120129 A1 | 5/2008 | Seubert et al. |
| 2008/0183532 A1 | 7/2008 | Barnard et al. |
| 2008/0215413 A1 | 9/2008 | Barnard et al. |
| 2008/0306755 A1 | 12/2008 | Barnard et al. |

FOREIGN PATENT DOCUMENTS

WO    WO 2004072813    8/2004

* cited by examiner

*Primary Examiner* — Dustin Nguyen
*Assistant Examiner* — Joel Mesa
(74) *Attorney, Agent, or Firm* — David M. Breiner; BrownWinick Law Firm (57) ABSTRACT

The web-enabled system provides an electronic document exchange environment where transactional information is received by the system in one format, translated to a second format, and sent. The system allows its users to bypass the costs involved in owning or accessing an EDI translator or a value-added network and generates and sends an electronic receipt for auditing purposes. In addition to the translation of information, the system creates the functional acknowledgment message (the electronic receipt), associates it with the transactional information, and sends it to the intended recipient. The functional acknowledgement message is then returned to the system by that recipient. The system may translate the functional acknowledgement to the first format or may not. Once received, the system then sends the acknowledgement to the original provider of the transactional information. This loop allows the originator to determine whether its transactional information was received.

18 Claims, 6 Drawing Sheets

ELECTRONIC RECEIPT FOR PURCHASE ORDER

FIELD OF THE INVENTION

The present invention relates in general to electronic data interchange systems and more particularly to a web-enabled system for facilitating sending and receipt of supply chain documents between business entities.

BACKGROUND OF THE INVENTION

When trading partners transact business, specific information is exchanged in a particular sequence. One example of such a sequence is when an order is placed, receipt of the order is acknowledged, fulfillment information is provided, the order is filled and delivered, bills are sent, payments are made. Of course, many other scenarios exist to describe various transactions. These transactions traditionally included human participation in every single one of these activities and paper confirmations of many. Many of these activities, then, required re-entry of certain information at each stage resulting in relatively long transaction times and plenty of possibility for human error at several steps in the process.

In recent years, structured transmission of data between business organizations by electronic means has replaced some of the more manual transactions described above and has become commonplace in certain industries. Electronic Data Interchange (EDI) includes the transmittal of electronic data from one trading partner to another and may include information pertaining to purchase orders, advance ship notices, invoice, ship notice/manifest, functional acknowledgement, product activity data, application advice, carrier bill of lading, UPC electronic catalog, transportation carrier shipment status to name but a few. In short, almost all of the activities traditionally reliant on human intervention and its associated disadvantages can be facilitated by computer-to-computer communication of data.

In general, EDI includes the transfer of data computer-to-computer and requires strictly formatted messages that represent documents. Most often the processing of received messages is by computer. The messages are formatted according to a standardized format of electronic documents which are independent of communication and software technologies.

In the usual EDI standard arrangement, each trading partner in a pair has access to its own EDI translator and the transactions occur with the help of a value added network. The value added network receives a transmission, determines its destination, and sends it on. Some value added networks also offer a service whereby it receives from the sender a message (in strict EDI format) and re-maps certain data as requested by the recipient within a strict EDI formatted document and then sends the re-mapped message on to the recipient. This arrangement typically requires that each trading partner pays for the EDI translator and the value added network service which can be quite costly.

One of the many standard documents exchanged in an EDI transaction is a "functional acknowledgement" receipt. In a classic example of its use, a trading partner sends an order through its own EDI translator and a value added network to a different EDI translator owned by another trading partner. The EDI translator owned by the receiving trading partner translates the order for the receiving trading partner. The receiving trading partner then sends a "functional acknowledgement" message back along the same path that indicates the order was received and usually serves no other function. The recipient may first perform certain validation tasks prior to sending the "functional acknowledgement" message, but that is not always the case. This routine allows the sender to be able to ascertain whether the order was received. Of course, the expectation here is that the computers belonging to the respective trading partners perform these tasks with little or no human intervention.

Clearly, a small trading partner can be at a disadvantage in the EDI standards world. Often, larger trading entities have developed their own message guidelines within the standards of EDI and may be unwilling to modify them. This leaves smaller companies with the onerous task of creating new message guidelines of their own in order to work with the larger trading entity. Further, a smaller company working with several larger trading entities may have to create a separate set of message guidelines for each of the larger entities it works with. And, the smaller entity would be faced with the costs of mapping data points to meet both the EDI standards and the individual demands of the more powerful trading partner, perhaps incurring costs of an EDI translator and use of a value added network.

One method of improving transactions between trading partners is to facilitate information sharing with upstream and downstream trading partners to minimize obstacles caused by use of disparate electronic documents and formatting issues. Facilitation of information sharing can result in optimization of demand forecasting, and more accurate production and inventory planning, as well as better predictors for and management of sales, marketing, and distribution. Current methods of information sharing, including Electronic Data Interchange (EDI) as mentioned above and middleware, are generally expensive and difficult to implement. Common obstacles include the number of business partners (often several hundred), the complexities of business process integration, the multiple legacy operating systems, applications, and databases involved, and the proprietary technologies used.

Recently, the service industry has begun offering web-enabled system alternatives for assisting and facilitating these transactions between trading partners. These services include the service provider as an agent or middle-man for receiving and translating documents between trading partners. The more advanced of these services accepts information in a format specific to a first trading partner and, through mapping, converts it to another format which is specified by a second trading partner. In doing so, the requirement for both partners to comply with EDI standards is removed along with the need for use of EDI translators and value added networks and it is possible for one or both partners to simply use their customary electronic documents. The data points on a partner's customary document are mapped to the specifications of the service provider. However, because the service provider in this scenario is the information translator and conduit, certain requirements of the traditional transaction (and expectations of the trading partners) such as functional acknowledgments pose new problems. Specifically, although the service provider can (and some do) provide a functional acknowledgement message to the sender indicating that the service provider received the original message, that is not the same as receiving a confirmation from the intended recipient of the original message. Some trading partners do not consider this sort of functional acknowledgement to be the equivalent of one provided by the recipient.

What is needed is a cost-effective, non-invasive software solution designed to streamline and improve supply chain operations for manufacturers, distributors, buying groups, and retailers of goods and services. A system that enables real-time, effective information sharing among trading partners throughout the supply chain without requiring each trading partner to own an EDI translator or to convert its own documents to EDI standards would resolve several current problems. A solution that will eliminate the traditional cost, time, and infrastructure barriers caused by the diversity of legacy systems employed by disparate trading partners while still providing the necessary checks and balances related to the transactions is needed.

It is one objective of the present invention to provide a less costly alternative to each trading partner than employing its own EDI translator.

It is another objective of the present invention to reduce the costs of exchanging documents electronically by removing the costs of a value-added network.

It is another objective of the present invention to provide a system whereby the sender of an order or other message will receive a functional acknowledgement from the recipient rather than from the agent or service provider.

It is a final objective of the present invention to provide an alternative process that is easily accessible, highly efficient, and complete with regard to all of the communications necessary for completing a transaction.

SUMMARY OF THE INVENTION

The present invention provides a web-enabled system that employs a business to business exchange of documents in an electronic format but does not necessarily requirement EDI compliant formatted documents. The system accepts information in a sender's preferred format, translates it to the intended recipient's desired format, and delivers it to the sender all via internet exchange of documents. In short, the system can be described as a translator of documents from "any to any" format.

Each document can be described by three key elements, namely, document format, transport method or protocol, and document specifications that dictate what data elements will be exchanged. A user of this sort of system has the advantage of needing only a single protocol and format to connect to all of its trading partners through the system rather than having to tailor its documents and protocols according to recipient's specifications. And at the same time, the user does not have to adhere to strict EDI standards. The user maps its document elements to only one specification and then uses only one communication protocol to service all of its trading partners. Removing the need for EDI translators and value added networks while still placing a smaller trading partner in a position to meet the larger trading partner's electronic document demands represents a vast improvement in supply chain management and vendor/warehouse distributor relationships.

The preferred embodiment of the present invention includes web-enabled processing so that the user sends and receives documents to a single location on the internet for all of its transactions with trading partners. The present invention includes the ability for "any to any" format translation as well as facilitates the generation and sending of a functional acknowledgment from the message recipient to the message sender, rather than from the system. The generation of a functional acknowledgment is accomplished upon receipt and translation of a first message from the first trading partner. The system interrogates this first message for predetermined information, copies certain data, and then creates an acknowledgement message populated with the copied data. Thereafter the acknowledgement message is sent to the intended recipient along with the first message. The intended recipient may simply turn the acknowledgement message around and send back to the system to be forwarded to (or translated and then forwarded to) the first trading partner, or the recipient may first validate, compare or review the message prior to turn around. In this way, the system provides a functional acknowledgement to the sender from the receiver.

The web-enabled system of the present invention addresses the problems identified in prior systems. First, the system can function to convert electronic documents in any format to any other format through the use of mapping. Second, by providing means for the sender to have a functional acknowledgement from the recipient, therefore providing the information necessary to determine whether the sender's message was received. Finally, the functional acknowledgement contributes to an audit trail thereby filling in information that has previously been missing in the offerings of multiple format document translation service providers. Preferably, the turn around of the functional acknowledgement is fast enough that the sender can track any messages not received and resend in a timely fashion.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DETAILED DESCRIPTION

Figure 1:
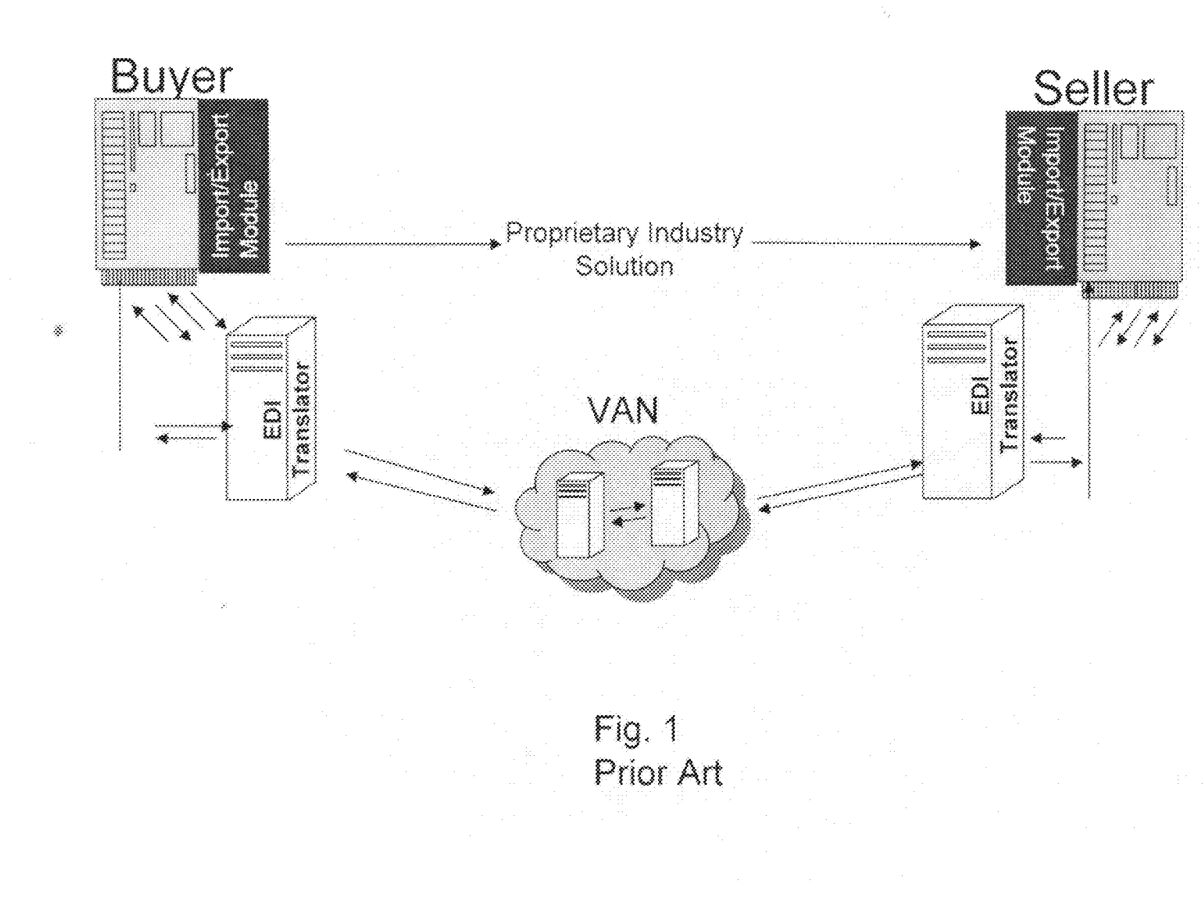
FIG. 1 is a schematic showing an electronic data interchange between trading partners including a value-added network arrangement of the prior art.

Prior art (as illustrated in FIG. 1) includes an electronic data interchange (EDI) system whereby each trading partner owns or accesses an EDI translator to translate its messages to standard format and uses a value added network to determine the intended recipient and send the translated message to the second trading partner's EDI translator. The second translator then translates the message from the standard format to one preferred by the second trading partner and then sends it to the second trading partner. In this scenario, a functional acknowledgement is created by the second trading partner, sent to its EDI translator to be translated, then back through the value added network to the first EDI translator where it is again translated but this time to the first trading partner's preferred format, and then sent to the first trading partner. Upon receipt of the functional acknowledgement, the first trading partner knows that its message was received by the second trading partner.

Figure 2:
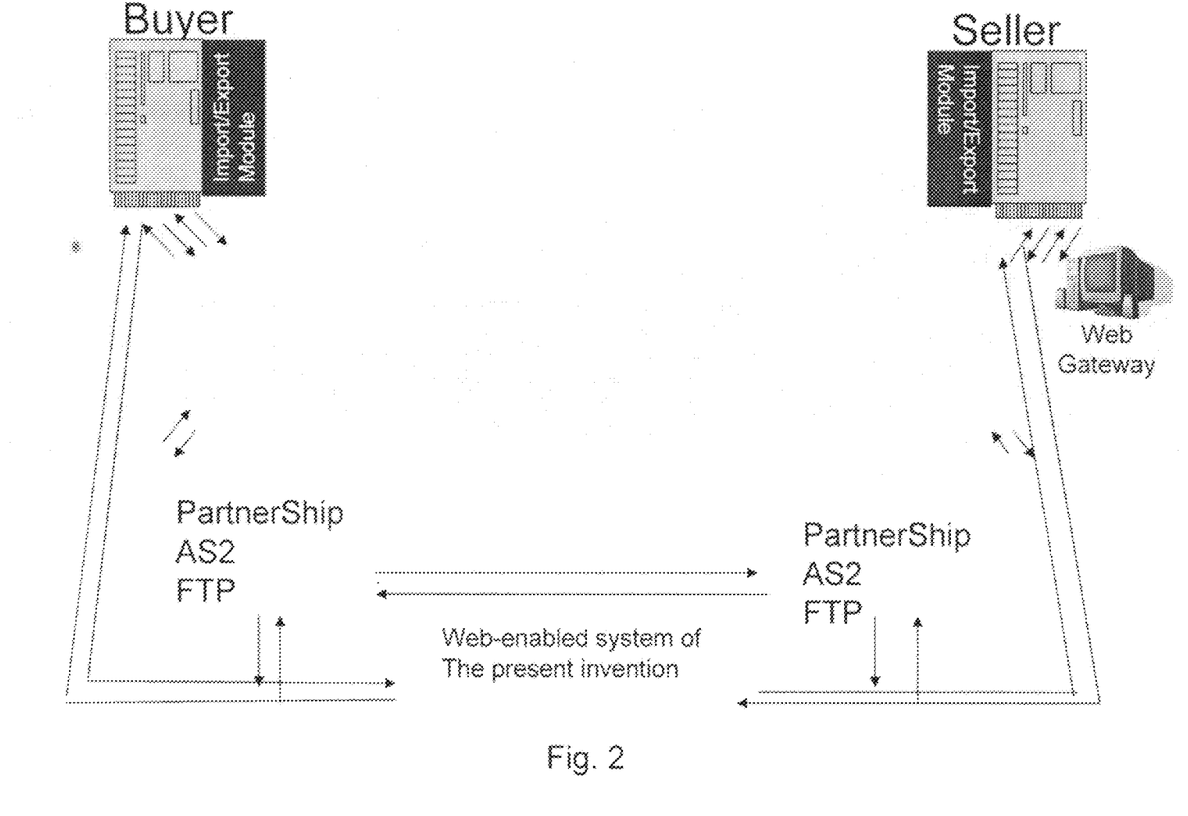
FIG. 2 is a schematic showing the arrangement of the components of a communication method employed by the present invention.

The present invention comprises a computer readable medium having instructions for execution by a processor. Preferably, the present invention is employed in an internet-enabled environment (FIG. 2) via a website or via other internet-based protocols such as FTP, AS2 and PartnerShip Network and serves a plurality of trading partners. The web-enabled system may include one or a plurality of some or all of the following: a web server, an application server, a database server, a router, a switch, a firewall device as well as additional computing or network hardware. Specifically and notably, the system of the present invention handles and translates multiple document formats including XML and Flat (or Text) files as well as EDI formatted files.

Figure 3:
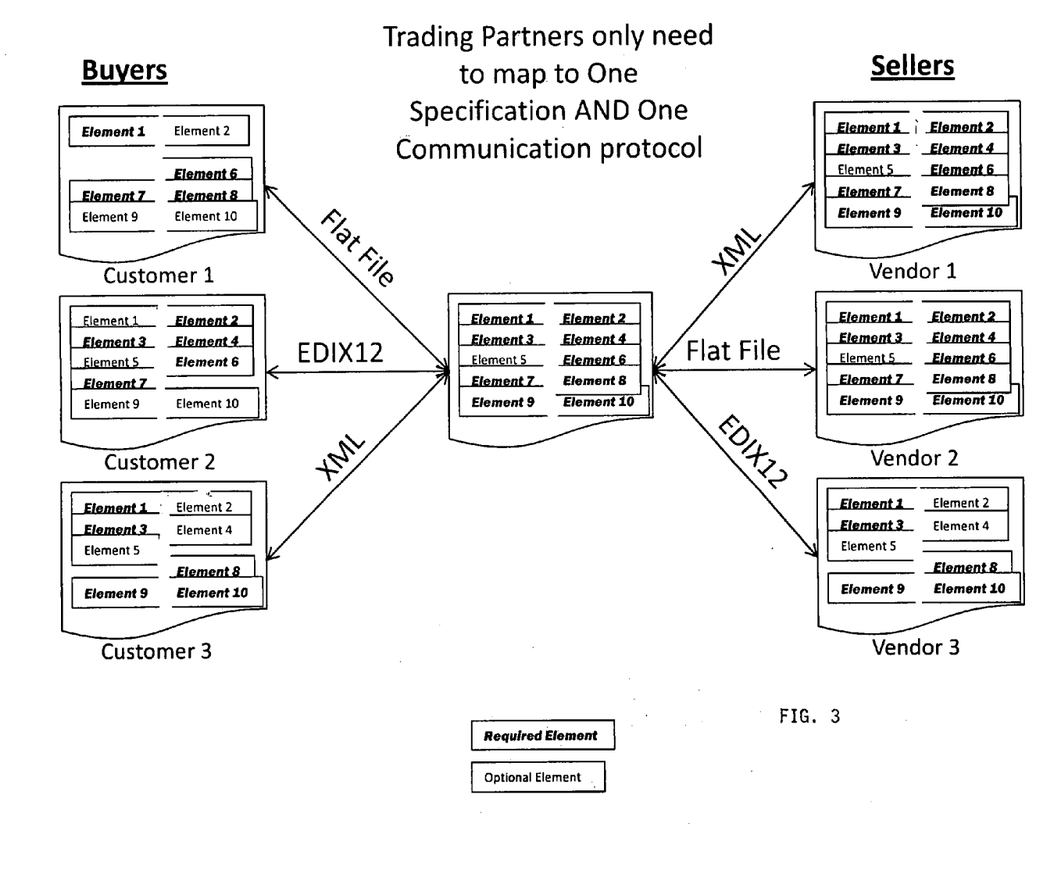
FIG. 3 is a schematic showing the electronic data interchange between trading partners of the present invention.
Figure 4:
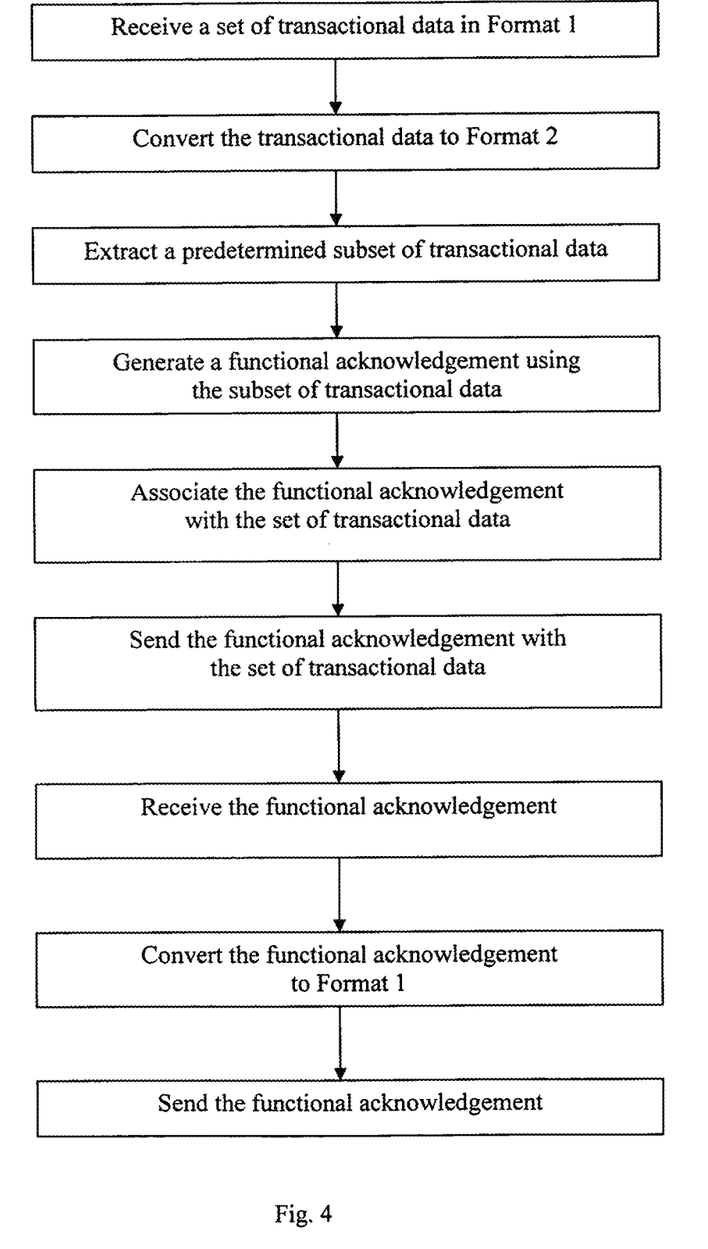
FIG. 4 is a schematic describing a process for creating a functional acknowledgement.
Figure 5:
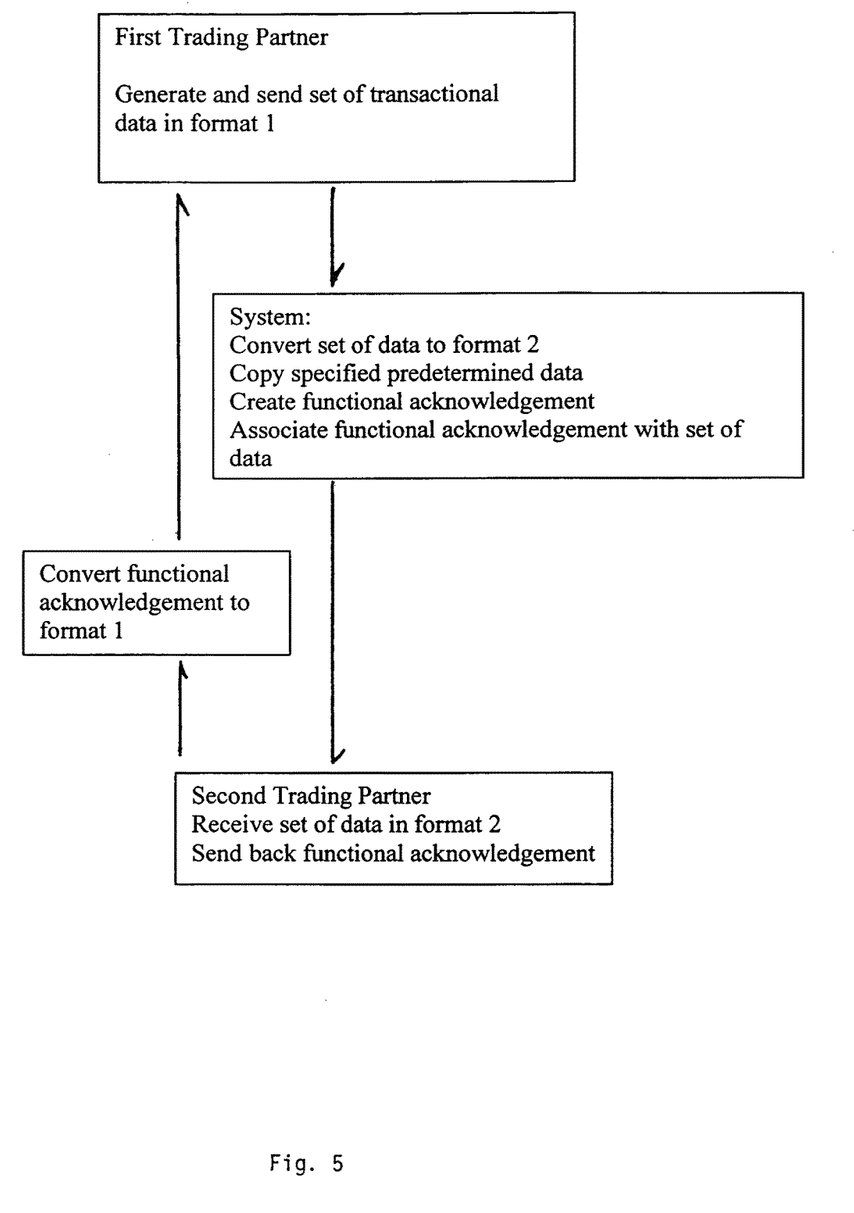
FIG. 5 is a flow chart illustrating the tasks implemented during the creation, turn around and receipt of the functional acknowledgement of the present invention.
Figure 6:
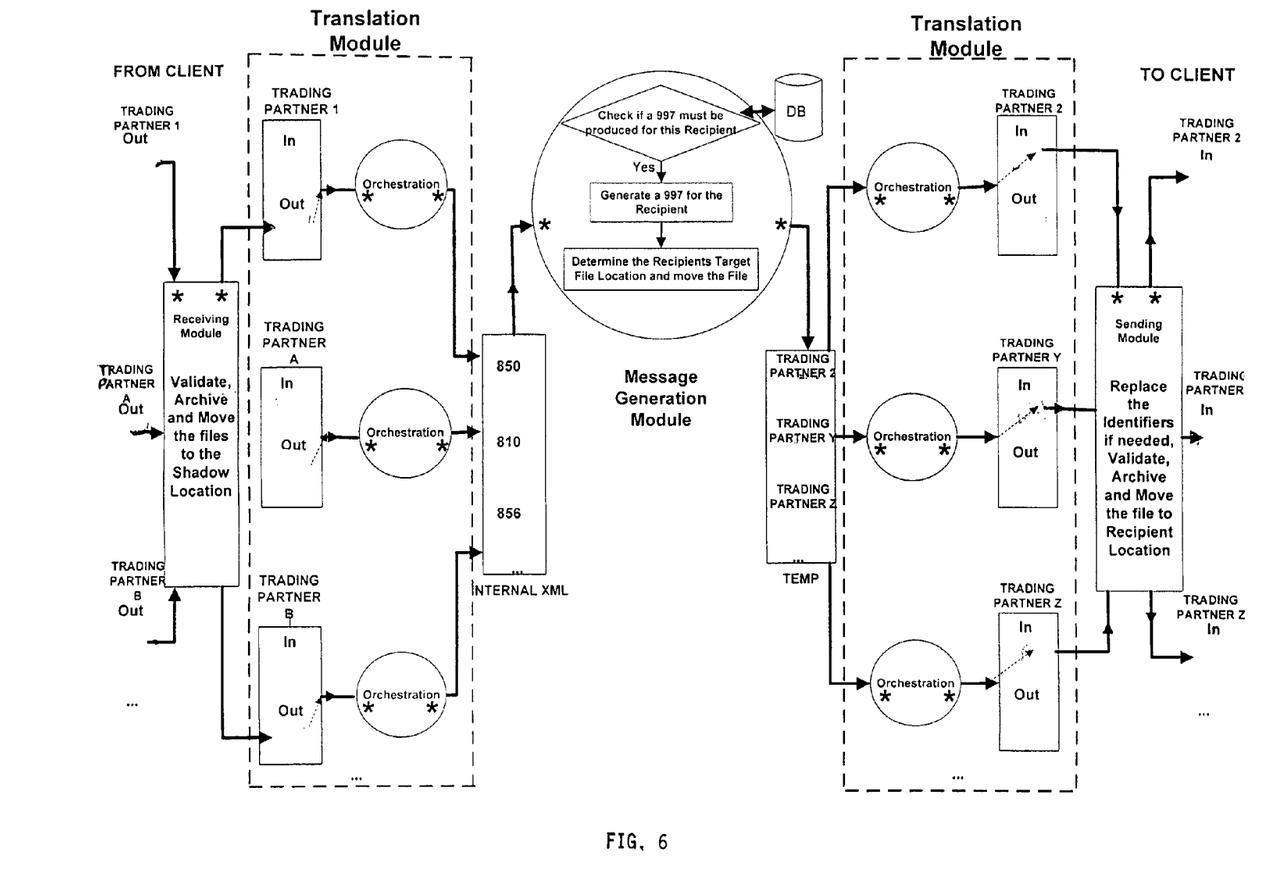
FIG. 6 is a schematic showing the flow of messages and translations in the present invention.

Referring now to FIGS. 3 and 5, the computer readable medium of the present invention is resident on a server or servers and comprises instructions to receive a first message from a first trading partner in a first format. Then as also shown in FIG. 6, instructions cause the processor to validate, archive and move the message to a first location where the first trading partner's mapping is applied to translate the message to the system's format. The processor is then instructed to determine whether an acknowledgement message is desired and, if so, to generate the acknowledgement message (see FIG. 4) for the intended recipient second trading partner. Thereafter the location of the file of the intended recipient (i.e. second trading partner) is determined and said first message and the acknowledgement message are associated and then moved together to a second location accordingly. The instructions next cause the processor to employ the second trading partner's mapping to translate the message from the system's format into a second format which has been specified by said second trading partner. Thereafter, the instructions cause the processor to validate, archive the message and move it to said second trading partner's location.

In the preferred embodiment and referring once again to FIG. 4, when an acknowledgement message is desired, the computer readable medium further comprises instructions causing the processor to interrogate the first message for a set of specified information. The instructions then cause the processor to create a functional acknowledgement message, and populate the functional acknowledgement message with at least a subset of said specified information. The information populating the functional acknowledgement message can be dictated by the first trading partner according to the information it wishes to receive back.

Once the first message and the functional acknowledgement message are retrieved by said second trading partner, the acknowledgement message is identified by a file extension or other specified identifying means. The second trading partner puts the acknowledgement message in the "outbound" folder. The most preferred embodiment of the computer readable medium of the present invention still further comprises instructions causing the processor to receive and process said functional acknowledgement message upon return from said second trading partner and send it to said first trading partner. In another embodiment, upon receipt of the functional acknowledgement from the second trading partner, the processor causes the functional acknowledgement message to be sent to the first location where the first trading partner's maps are applied to translate it to the first mapped format and then causes the functional acknowledgement to be returned to said first trading partner.

The aforementioned tasks are accomplished via the use of a receiving module, a translation module, a message generation module, and a sending module as shown in FIG. 6.

Thus, the present invention has been described in an illustrative manner. It is to be understood that the terminology that has been used is intended to be in the nature of words of description rather than of limitation.

Many modifications and variations of the present invention are possible in light of the above teachings. For example, the functional acknowledgement message may be created in the second format, and then upon return from the second trading partner to the system, translated back to the first format before sending to first trading partner. Or, it may be sent to second trading partner in first format if the second trading partner plans to do nothing other than rebound it to the system for forwarding to the first trading partner. Further, the first message may be translated either before or after the system extracts data and creates the functional acknowledgement message. There are several methods of connectivity contemplated including FTP AS2 and PartnerShip Network and a variety of combinations of hardware and software that might be employed. It is likely that other methods of connectivity and new hardware will be developed in the future and their employment with the present invention is considered to be within the scope of this invention. Therefore, within the scope of the appended claims, the present invention may be practiced otherwise than as specifically described.

What we claim is:

1. A web-enabled system for translating data from a first format to at least a second format for facilitating sending and receipt of supply chain documents between a first trading partner having an account with said system and a second trading partner having an account with said system, the system comprising:

a system proxy to the first and second trading partners, the system including a transfer network comprising a receiving module, a translation module, a message generation module, and a sending module, wherein the receiving module is configured to receive a set of transactional information in the first format and employ an internet-based protocol, the translation module is configured to apply a first set of mapping instructions to the transactional information to translate the transactional information from the first format to a system format and apply a second set of mapping instructions to translate said transactional information from said system format to the second format, the message generation module is configured to obtain a subset of said transactional information and originate a functional acknowledgement message containing said subset on behalf of the second trading partner, and the sending module is configured to employ an internet-based protocol, wherein the system is configured to send the functional acknowledgment message generated by message generation module to the second trading partner without applying the second set of mapping instructions to the functional acknowledgment message.

2. The system of claim 1, wherein said sending module sends said transactional information in said second format to said second trading partner.

3. The system of claim 2, wherein prior to handling of said set of transactional information by said sending module, said message generation module obtains said subset of said transactional information and creates said functional acknowledgement message containing said subset.

4. The system of claim 1, wherein said message generation module associates the functional acknowledgement message with said transactional information.

5. The system of claim 1, wherein prior to translation of said set of transactional information to said second format, said message generation module generates the functional acknowledgment message.

6. The system of claim 1 wherein said translation module associates said functional acknowledgement message with the translated set of transactional information translated into the second format.

7. The system of claim 6 wherein said sending modules sends the transactional information translated into the second format and the associated functional acknowledgement message to the second trading partner.

8. The system of claim 7 wherein the receiving module receives the associated functional acknowledgment message from the second trading partner and said sending module sends the associated functional acknowledgement message to the second trading partner.

9. The web-enabled system disclosed in claim 1, wherein the functional acknowledgment message generated by the message generation module and sent to the second trading partner is the same functional acknowledgment message sent to the first trading partner.

10. The system of claim 1, wherein the functional acknowledgement message originated by the message generation module is not a translation of a functional acknowledgement message created by either one of the first and second trading partners.

11. A web-enabled system comprising a nontransitory computer readable medium wherein said computer readable medium comprises instructions causing a processor to:
   a) receive a set of transactional data in a first format from a first trading partner;
   b) originate a functional acknowledgment message comprising at least a subset of said transactional data on behalf of a second trading partner;
   c) translate said set of transactional data to a second format without translating the functional acknowledgement message into the second format;
   d) associate said functional acknowledgement message with said set of transactional data in said second format;
   e) send said set of transactional data in said second format and said associated functional acknowledgment message to the second trading partner;
   f) receive said functional acknowledgement message from the second trading partner; and
   g) send said functional acknowledgement message to the first trading partner, wherein the processor is associated with a system proxy to the first and second trading partners.

12. The web-enabled system of claim 11 wherein after said functional acknowledgment message is received by said processor, said computer readable medium further comprises instructions causing said processor to translate said functional acknowledgement message to said first format prior to sending said functional acknowledgment message.

13. The web-enabled system of claim 11 wherein said first set of transactional data is received from the first trading partner and said at least a subset of said transactional data in said second format and said functional acknowledgement message are sent to the second trading partner, and said functional acknowledgement message is received by said first trading partner from said second trading partner.

14. The web-enabled system disclosed in claim 11 wherein web-enabled comprises at least one physical server machine connected to the internet and allowing communication between parties through at least one protocol selected from the group consisting of: TCP/IP, FTP, SFTP, AS2, PartnershipNetwork and Web-Services.

15. The web-enabled system disclosed in claim 14 further comprising at least one additional server, at least one switch, at least one router, at least one firewall device, at least one load balancer, and at least one hub.

16. The system of claim 1, wherein information populating the functional acknowledgment message is dictated by the first trading partner.

17. The web-enabled system disclosed in claim 11, wherein information populating the functional acknowledgement message is dictated by the first trading partner.

18. The web-enabled system of claim 11, wherein the functional acknowledgement message originated by the processor is not a translation of a functional acknowledgement message created by either one of the first and second trading partners.

* * * * *